(12) United States Patent
Aoki

(10) Patent No.: US 11,962,730 B2
(45) Date of Patent: Apr. 16, 2024

(54) IMAGE PROCESSING APPARATUS, IMAGE FORMING APPARATUS, AND INFORMATION PROCESSING APPARATUS WITH IMPROVED RECOVERY FROM A POWER SAVING MODE

(71) Applicant: Ryuta Aoki, Tokyo (JP)

(72) Inventor: Ryuta Aoki, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 18/112,453

(22) Filed: Feb. 21, 2023

(65) Prior Publication Data

US 2023/0276007 A1  Aug. 31, 2023

(30) Foreign Application Priority Data

Feb. 28, 2022 (JP) .................. 2022-029361

(51) Int. Cl.
*H04N 1/00* (2006.01)
(52) U.S. Cl.
CPC ..... *H04N 1/00904* (2013.01); *H04N 1/00896* (2013.01); *H04N 2201/0094* (2013.01)
(58) Field of Classification Search
CPC ........... B41J 2/0457; B41J 2209/3932; G03G 15/0283; G03G 15/5004; G03G 15/80; G03G 21/1867; G03G 2215/00983; H04N 1/00904; H04N 1/00896; H04N 2201/0094
See application file for complete search history.

(56) References Cited

U.S. PATENT DOCUMENTS 9,648,188 B2 *   5/2017   Fujisawa ............ H04N 1/00891
11,006,014 B2 *  5/2021   Hashimoto ........ H04N 1/00888
2019/0095138 A1  3/2019   Sakurada et al.

FOREIGN PATENT DOCUMENTS

JP        2013-197677        9/2013

* cited by examiner

*Primary Examiner* — Barbara D Reinier
(74) *Attorney, Agent, or Firm* — Duft & Bornsen, PC

(57) ABSTRACT

An image processing apparatus includes: a first controller including first control circuitry and first power supply control circuitry; and a second controller including second control circuitry and second power supply control circuitry. The first control circuitry controls an image former. The second control circuitry controls an external interface. In a case where power supply to the first control circuitry and the second control circuitry except for general-purpose input-and-output ports is stopped in a power saving mode, when detecting a factor of recovery from the saving mode, the second power supply control circuitry powers on the second control circuitry though a general-purpose input-and-output port and notifies the first power supply control circuitry of the recovery though a general-purpose input-and-output port, and when receiving notification of the recovery from the second power supply control circuitry, the first power supply control circuitry powers on the first control circuitry though a general-purpose input-and-output port.

9 Claims, 10 Drawing Sheets

FIG. 9

| | DEFAULT (NO FACTOR OF RECOVERY) | FACTOR OF RECOVERY 1 | FACTOR OF RECOVERY 2 | FACTOR OF RECOVERY 3 |
|---|---|---|---|---|
| wakeup1 | 1 | 1 | 0 | 0 |
| wakeup2 | 1 | 0 | 1 | 0 |

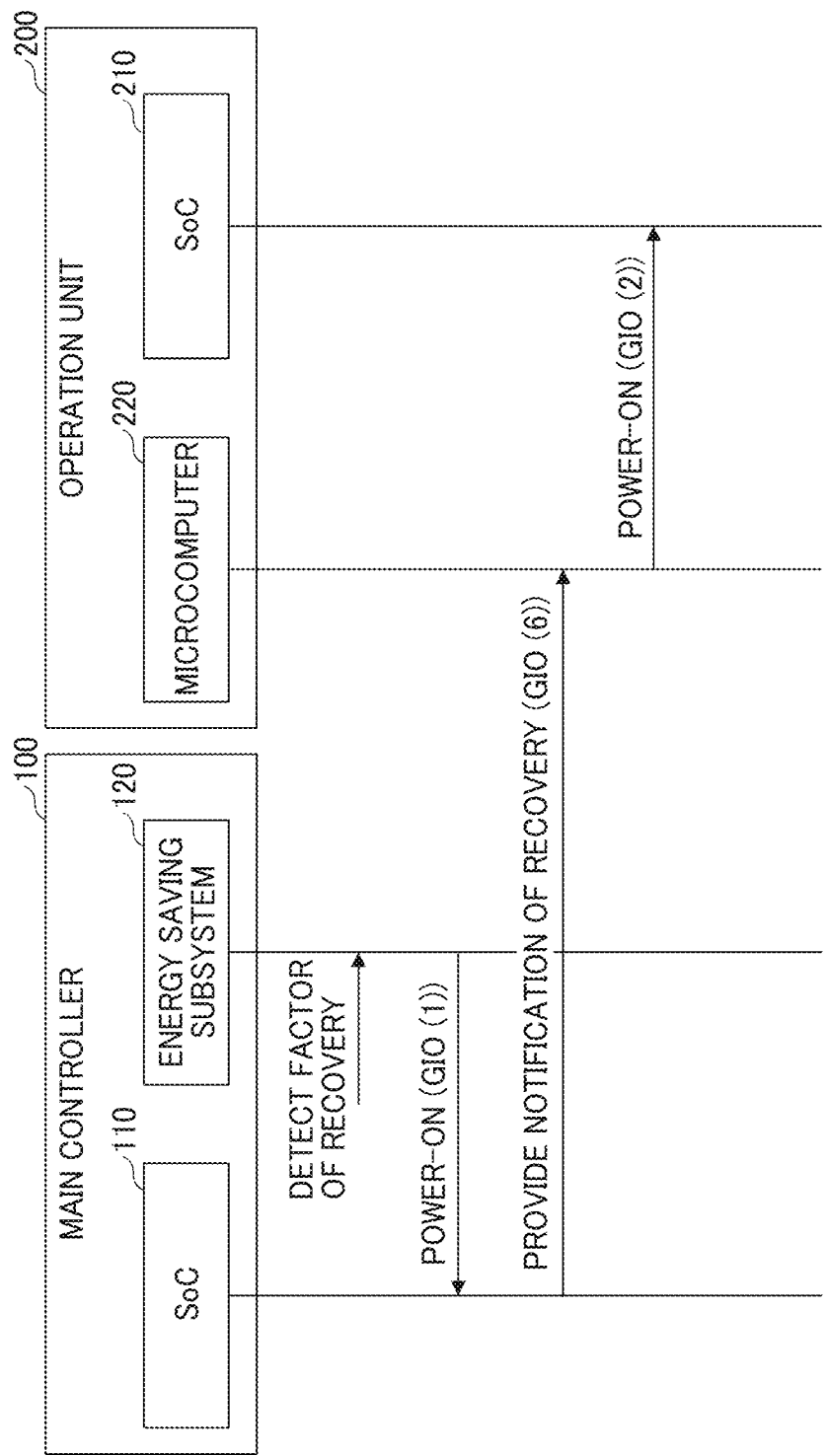

IMAGE PROCESSING APPARATUS, IMAGE FORMING APPARATUS, AND INFORMATION PROCESSING APPARATUS WITH IMPROVED RECOVERY FROM A POWER SAVING MODE

CROSS-REFERENCE TO RELATED APPLICATION

This patent application is based on and claims priority pursuant to 35 U.S.C. § 119(a) to Japanese Patent Application No. 2022-029361, filed on Feb. 28, 2022, in the Japan Patent Office, the entire disclosure of which is hereby incorporated by reference herein.

BACKGROUND

Technical Field

Embodiments of the present disclosure relate to an image processing apparatus, an image forming apparatus, and an information processing apparatus.

Related Art

An image processing apparatus including a plurality of modules with predetermined functions may include a communication interface that communicates data, control signals, and the like between the modules in order to implement functions of the image processing apparatus. For example, this type of image processing apparatus includes an Inter Integrated Circuit ($I^2C$) bus (registered trademark) that interconnects the modules as the communication interface. Then, management information of the image processing apparatus such as anomaly information is transmitted between the module serving as the master and the module serving as the slave via an $I^2C$ bus. In the communication using the $I^2C$ bus, the module serving as the master needs to transmit the start condition bit and the address assigned to the module serving as the slave, thereby to establish the connection with the module serving as the slave before communicating the data. For this reason, when the image processing apparatus recovers from the power saving mode, for example, a connection establishment sequence using an address is required every time management information is transmitted between modules, and the time of recovery from the power saving mode may be long.

SUMMARY

In an embodiment of the present disclosure, an image processing apparatus includes a first controller and a second controller. The first controller includes first control circuitry and first power supply control circuitry. The first control circuitry controls an image former to form an image. The first power supply control circuitry controls power supply to the first control circuitry. The second controller includes second control circuitry and second power supply control circuitry. The second control circuitry controls an external interface to receive an operation from outside of the image processing apparatus. The second power supply control circuitry controls power supply to the second control circuitry. The first power supply control circuitry and the first control circuitry are connected through a first general-purpose input-and-output port. The second power supply control circuitry and the second control circuitry are connected through a second general-purpose input-and-output port. The first power supply control circuitry and the second power supply control circuitry are connected through a third general-purpose input-and-output port. In a case in which power supply to the first control circuitry and the second control circuitry except for the first general-purpose input-and-output port, the second general-purpose input-and-output port, and the third general-purpose input-and-output port is stopped in a power saving mode, when the second power supply control circuitry detects a factor of recovery from the power saving mode, the second power supply control circuitry powers on the second control circuitry though the second general-purpose input-and-output port and notifies the first power supply control circuitry of a recovery from the power saving mode though the third general-purpose input-and-output port, and when the first power supply control circuitry receives a notification of the recovery from the power saving mode from the second power supply control circuitry, the first power supply control circuitry powers on the first control circuitry though the first general-purpose input-and-output port.

In another embodiment of the present disclosure, an image forming apparatus includes an image former, a first controller, and a second controller. The image former forms an image. The first controller includes first control circuitry and first power supply control circuitry. The first control circuitry controls the image former to form the image. The first power supply control circuitry controls power supply to the first control circuitry. The second controller includes second control circuitry and second power supply control circuitry. The second control circuitry controls an external interface to receive an operation from outside of the image forming apparatus. The second power supply control circuitry controls power supply to the second control circuitry. The first power supply control circuitry and the first control circuitry are connected through a first general-purpose input-and-output port. The second power supply control circuitry and the second control circuitry are connected through a second general-purpose input-and-output port. The first power supply control circuitry and the second power supply control circuitry are connected through a third general-purpose input-and-output port. In a case in which power supply to the first control circuitry and the second control circuitry except for the first general-purpose input-and-output port, the second general-purpose input-and-output port, and the third general-purpose input-and-output port is stopped in a power saving mode, when the second power supply control circuitry detects a factor of recovery from the power saving mode, the second power supply control circuitry powers on the second control circuitry though the second general-purpose input-and-output port and notifies the first power supply control circuitry of a recovery from the power saving mode though the third general-purpose input-and-output port, and when the first power supply control circuitry receives a notification of the recovery from the power saving mode from the second power supply control circuitry, the first power supply control circuitry powers on the first control circuitry though the first general-purpose input-and-output port.

In still another embodiment of the present disclosure, an information processing apparatus includes a first controller and a second controller. The first controller includes first control circuitry and first power supply control circuitry. The first control circuitry controls a data processor to execute data processing. The first power supply control circuitry controls power supply to the first control circuitry. The second controller includes second control circuitry and second power supply control circuitry. The second control circuitry controls an external interface to receive an operation from outside of the information processing apparatus. The second power supply control circuitry controls power supply to the second control circuitry. The first power supply control circuitry and the first control circuitry are connected through a first general-purpose input-and-output port. The second power supply control circuitry and the second control circuitry are connected through a second general-purpose input-and-output port. The first power supply control circuitry and the second power supply control circuitry are connected through a third general-purpose input-and-output port. In a case in which power supply to the first control circuitry and the second control circuitry except for the first general-purpose input-and-output port, the second general-purpose input-and-output port, and the third general-purpose input-and-output port is stopped in a power saving mode, when the second power supply control circuitry detects a factor of recovery from the power saving mode, the second power supply control circuitry powers on the second control circuitry though the second general-purpose input-and-output port and notifies the first power supply control circuitry of a recovery from the power saving mode though the third general-purpose input-and-output port, and when the first power supply control circuitry receives a notification of the recovery from the power saving mode from the second power supply control circuitry, the first power supply control circuitry powers on the first control circuitry though the first general-purpose input-and-output port.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein:

FIG. 7 is a diagram illustrating an example of a change in the power supply state of the image processing apparatus in a case where the image processing apparatus recovers from the second energy saving mode to a standby mode or the like;

FIG. 9 is a diagram illustrating an example of factors of recovery a notification of which is provided from a microcomputer to an energy saving subsystem; and FIG. 10 is a diagram illustrating an example of an operation sequence in a case where a factor of recovery from the second energy saving mode is a main controller.

Figure 1:
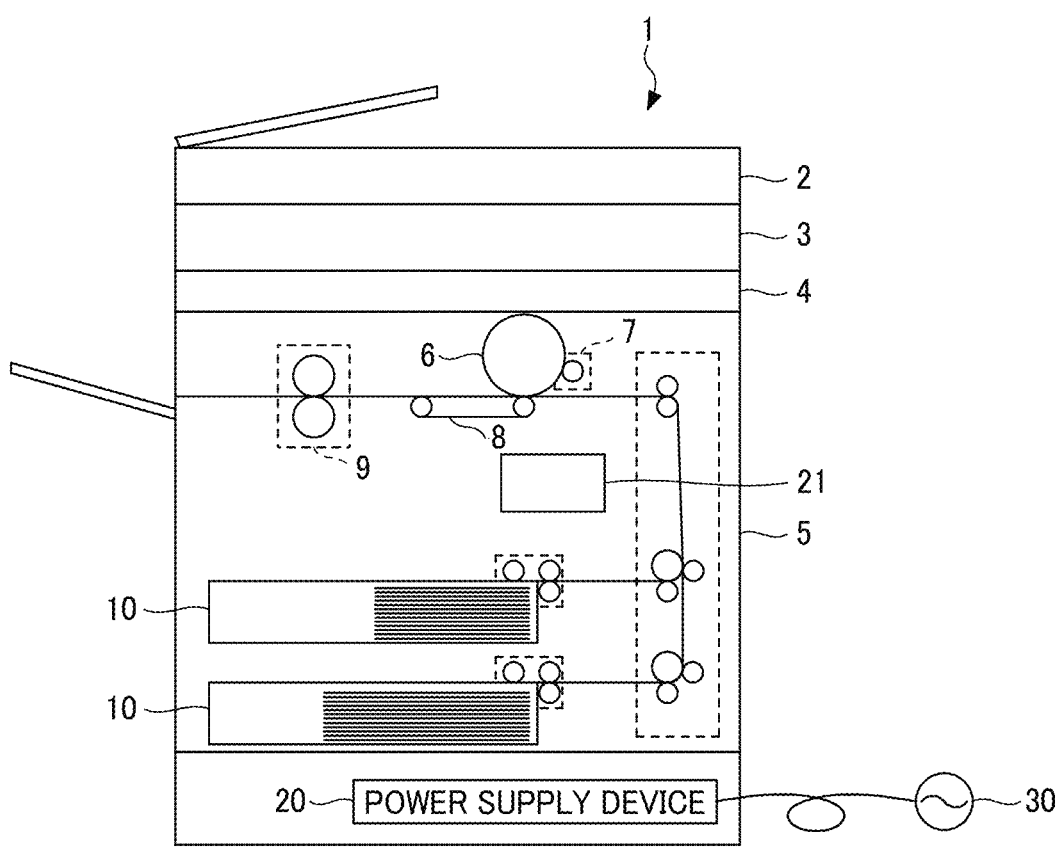
FIG. 1 is a general arrangement diagram illustrating an example of an image forming apparatus according to an embodiment of the present invention.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

Hereinafter, an image processing apparatus, an image forming apparatus, and an information processing apparatus according to embodiments of the present disclosure are described in detail with reference to the accompanying drawings. In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Hereinafter, the symbols indicating ports are also used as symbols indicating signal lines connected to the ports.

FIG. 1 is a general arrangement diagram illustrating an example of an image forming apparatus according to an embodiment of the present invention. An image forming apparatus 1 illustrated in FIG. 1 is a multi-function printer (MFP) having a copy function, a print function, a scanner function, a facsimile function, and the like, for example. The image forming apparatus 1 can switch among operation modes for implementing a copy function, a print function, a scanner function, and a facsimile function by an application switching key or the like of an operation unit. The image forming apparatus 1 enters a copy mode when the copy function is selected, enters a print mode when the print function is selected, enters a scanner mode when the scanner function is selected, and enters a facsimile mode when the facsimile function is selected. The image forming apparatus 1 may be a copier having the copy function alone, a printer having the print function alone, or a facsimile having the facsimile function alone.

In the image forming apparatus 1, the internal state switches among an operating mode (operating state), a wait mode (waiting state), an energy saving mode (power saving mode), or the like according to the state of the internal circuit. As described later, the image forming apparatus 1 has a plurality of energy saving modes.

For example, the operating mode includes a copy mode or a print mode in which an image, text data, or the like is printed on a paper medium or the like. The print mode includes an operation of printing received data on a paper medium or the like in the facsimile mode. The operating mode includes a transmission/reception operation in a scanner mode or a facsimile mode in which a document or the like is scanned. The state of the internal circuit is switched by operation of the operation unit by a user or control in the image forming apparatus 1.

For example, the image forming apparatus 1 includes an auto document feeder (ADF) 2, an image reading device 3, a writing unit 4, a printer unit 5, a power supply device 20, and a control device 21. The printer unit 5 includes a photoconductor drum 6, a developing device 7, a conveyance belt 8, a fixing device 9, and a storage space in which sheet feeding trays 10 are stored. The printer unit 5 creates a toner image to be transferred to a paper medium or the like based on image information. The printer unit 5 is an example of an image former that forms an image. Hereinafter, as an example of a flow of image formation in the image forming apparatus 1, a case where the operation mode is set to the copy mode will be briefly described.

In the copy mode, a plurality of documents to be copied is set in the auto document feeder 2. When a start button in the operation unit is pressed, the auto document feeder 2 feeds documents one by one to the image reading device 3. The image reading device 3 reads image information of each document sequentially sent from the auto document feeder 2. The image information read by the image reading device 3 is processed by an image processor mounted on the control device 21, for example.

The writing unit 4 converts the image information processed by the image processor into optical information. The photoconductor drum 6 is uniformly charged by a charger, and then exposed by laser light including the optical information converted by the writing unit 4. By the exposure, an electrostatic latent image is formed on the photoconductor drum 6. The developing device 7 develops the electrostatic latent image on the photoconductor drum 6 to form a toner image on the photoconductor drum 6. The conveyance belt 8 transfers the toner image to a paper medium or the like. The fixing device 9 fixes the toner image on the paper medium or the like. Then, the transfer sheet on which the image of the original has been copied is ejected from the ejector.

For example, in the wait mode described above, the image forming apparatus 1 is in a state before the start button is pressed in the copy mode, and in the operating mode, the image forming apparatus 1 is in a state between the press of the start button and the ejection of the paper medium or the like, and in a state in which a load such as a motor is operating. After the end of the operating mode, the state of the image forming apparatus 1 returns to the wait mode, and when the wait mode continues for a predetermined time, the image forming apparatus 1 enters the energy saving mode. Then, when the operation unit is operated during the energy saving mode, the state of the image forming apparatus 1 returns to the wait mode.

The power supply device 20 converts an alternating-current voltage supplied from an alternating-current power source 30 such as a commercial power source into a plurality of types of direct-current voltages (for example, a first direct-current voltage and a second direct-current voltage). The power supply device 20 supplies the converted first direct-current voltage to various loads such as the printer unit 5 of the image forming apparatus 1. Examples of the loads include various motors, a charger that charges the photoconductor drum 6, and a developing roller of the developing device 7. The power supply device 20 supplies the converted second direct-current voltage to the control device 21.

The second direct-current voltage supplied to the control device 21 is used as an operation power source for a central processing unit (CPU), a memory, and the like mounted on the control device 21. The control device 21 controls the entire operation of the image forming apparatus 1 by causing a controller such as a built-in CPU to execute a control program. Then, the control device 21 executes an image processing program or a data processing program to perform image processing or data processing, thereby forming an image to be transferred to a paper medium or the like.

Figure 2:
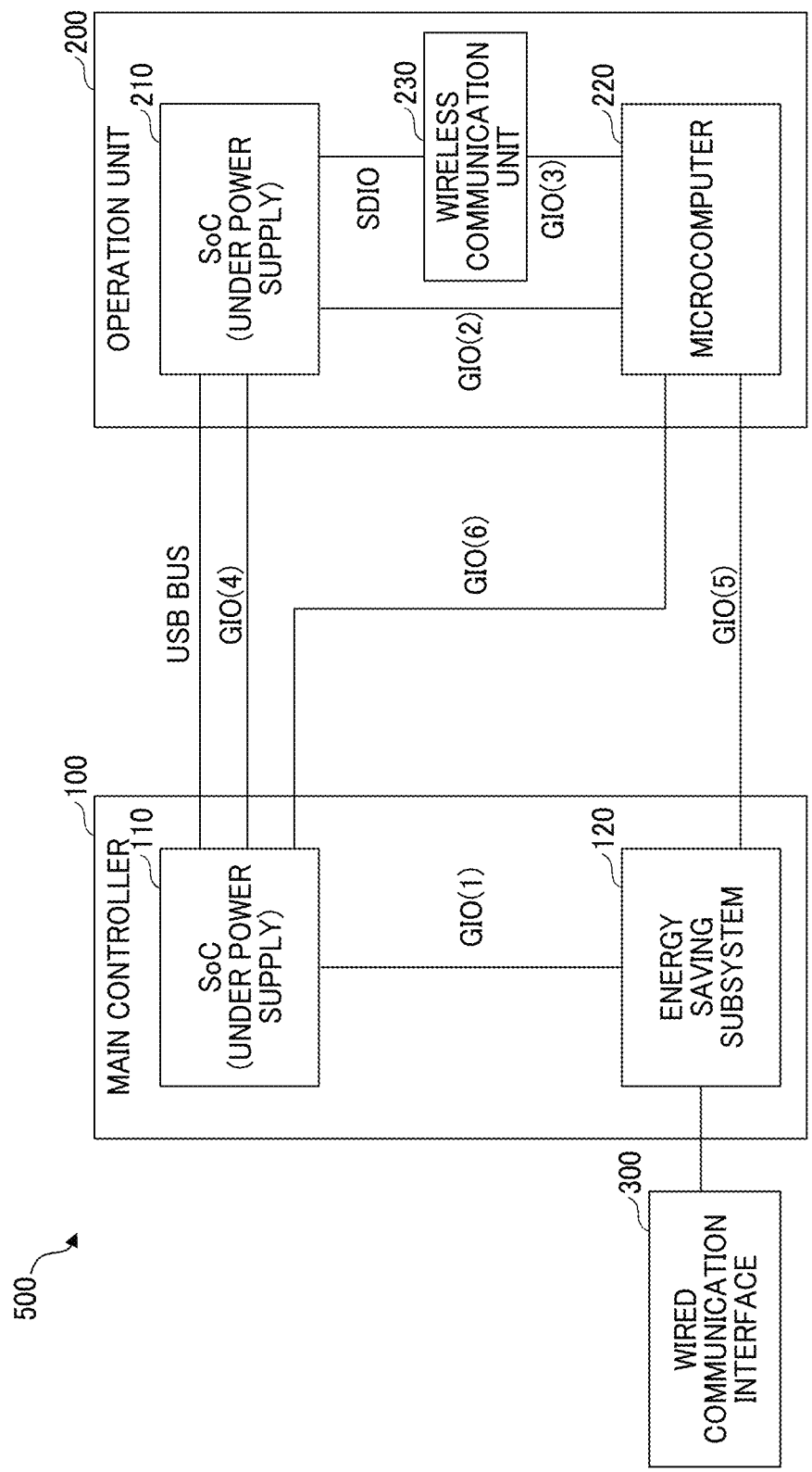
FIG. 2 is a block diagram illustrating an outline of a hardware configuration of a main part of the image forming apparatus in FIG. 1.

FIG. 2 is a block diagram illustrating an outline of a hardware configuration of a main part of the image forming apparatus 1 of FIG. 1. Hereinafter, the configuration illustrated in FIG. 2 will be referred to as an image processing apparatus 500 for convenience. The image processing apparatus 500 also has a function as an information processing apparatus that performs data processing to generate image data.

The image processing apparatus 500 includes a main controller 100, an operation unit 200 including an interface circuit with the outside such as a wireless communication unit and a controller, and a wired communication interface 300. For example, the wired communication interface 300 is a local area network (LAN) interface 300. The main controller 100 is mounted on the control device 21 illustrated in FIG. 1, for example. The operation unit 200 is provided near the image reading device 3 illustrated in FIG. 1 together with the operation panel, for example, and controls the operation panel.

FIG. 2 illustrates a state in the standby mode in which both a system on chip (SoC) 110 and a SoC 210 are powered and the printer unit 5 is ready for operation. While power is supplied to the image forming apparatus 1, an energy saving subsystem 120 and a microcomputer 220 are always powered and continue operation.

The main controller 100 includes the SoC 110 and the energy saving subsystem 120. The SoC 110 and the energy saving subsystem 120 are connected via a general-purpose input-and-output port GIO (1). For example, the energy saving subsystem 120 includes a CPU. The main controller 100 is an example of a first controller. The SoC 110 is an example of a first control unit. The energy saving subsystem 120 is an example of a first power supply control unit.

In the following description, general-purpose input-and-output ports and signal lines connecting the general-purpose input-and-output ports to each other may be referred to as GPIOs, but are simply referred to as GIOs here. The signal line of each GIO is at least one (one bit). The data transmitter sets each bit of the GIO to a high level (logical value 1) or a low level (logical value 0) to transmit data to the receiver. Here, transmission of data from the transmitter to the receiver through the GIO corresponds to writing of data to the receiver. Reception of data at the receiver via the GIO corresponds to reading of data by the receiver.

For example, each GIO is allocated for one-way communication from a transmitter to a receiver. Therefore, for example, if 1-bit data is transmitted and 1-bit data is received between the SoC 110 and the energy saving subsystem 120, a 2-bit GIO is used. One of various factors to be transmitted is defined for each pin of the GIO. In a case of communication by using the GIO, an operation of switching between the master and the slave is unnecessary, and an operation of transmitting the slave address before data communication is also unnecessary, unlike in a case of communication by using an I²C bus. This makes it possible to quickly perform handshaking of various states of elements connected to each other via the GIO.

The SoC 110 performs overall control of the image forming apparatus 1 such as control of the image forming device described above during activation of the image forming apparatus 1. The SoC 110 is connected to the SoC 210 via a universal serial bus (USB) and a GIO (4), and transmits and receives data to and from the SoC 210. The SoC 110 is also connected to the energy saving subsystem 120 via the GIO (1).

The energy saving subsystem 120 controls the power supply of the SoC 110 via the GIO (1) during the energy saving mode. The energy saving subsystem 120 is connected to the microcomputer 220 via a GIO (5) and transmits and receives data to and from the microcomputer 220. The SoC 110 is further connected to the microcomputer 220 via a GIO (6). The energy saving subsystem 120 is connected to the wired communication interface 300, and can perform network communication with the outside of the image forming apparatus 1.

The operation unit 200 includes the SoC 210, the microcomputer 220, and the wireless communication unit 230 that performs communication using a wireless LAN such as WiFi, for example. The operation unit 200 is an example of a second controller. The SoC 210 is an example of a second control unit. The microcomputer 220 is an example of a second power supply control unit.

The SoC 210 and the microcomputer 220 are connected via the GIO (2). The SoC 210 and the wireless communication unit 230 are connected via secure digital input-and-output (SDIO). The microcomputer 220 and the wireless communication unit 230 are connected via the GIO (3).

The SoC 210 controls the entire operation unit 200 and controls the wireless communication unit 230. The microcomputer 220 performs control of the operation panel such as detection of coordinates of a touched position on the operation panel and management of power source, for example. For example, the microcomputer 220 notifies the wireless communication unit 230 of a recovery event using the GIO (3).

The image processing apparatus 500 has a function of causing the image forming apparatus 1 to transition to any of a plurality of operation modes such as a standby mode, a first energy saving mode, and a second energy saving mode. Then, the image processing apparatus 500 changes the power supply state of the SoC 110 and the SoC 210 according to the operation mode.

Figure 3:
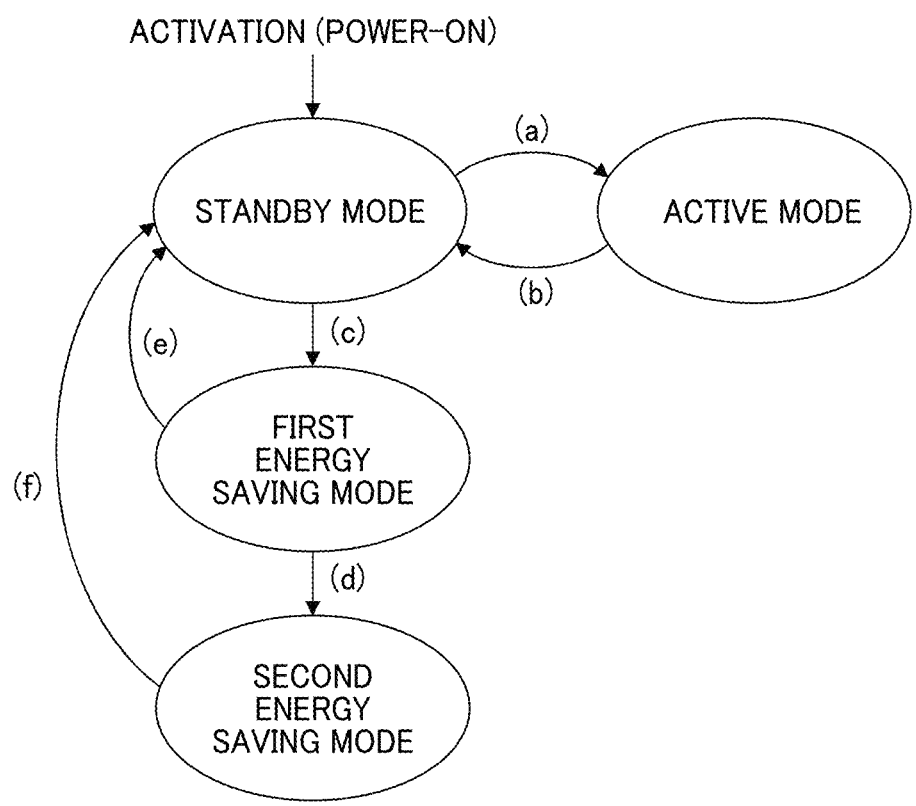
FIG. 3 is a state transition diagram illustrating an example of transition of operation modes of the image forming apparatus in FIG. 1.

FIG. 3 is a state transition diagram illustrating an example of transition of operation modes of the image forming apparatus 1 in FIG. 1. As described above, the transition of the operation mode of the image forming apparatus 1 is controlled by the image processing apparatus 500 illustrated in FIG. 2. The image forming apparatus 1 is set to the standby mode when activated by turning on the power switch.

In a case where an instruction for copying or scanning is received from the user via the operation panel during the standby mode, the image forming apparatus 1 transitions to the active mode and performs a copy operation (that is, the printing operation) or a scan operation (FIG. 3(a)). After the end of the copy operation or the scan operation, the image forming apparatus 1 returns to the standby mode (FIG. 3(b)).

On the other hand, in a case where the non-operation state continues for a predetermined time in the standby mode, the image forming apparatus 1 transitions from the standby mode to the first energy saving mode (FIG. 3(c)). When the non-operation state further continues for a predetermined time in the first energy saving mode, the image forming apparatus 1 transitions from the first energy saving mode to the second energy saving mode (FIG. 3(d)). In a case where the operation panel is operated, the auto document feeder 2 is opened, or a document to be scanned is set in the auto document feeder 2 during the first energy saving mode or the second energy saving mode, the image forming apparatus 1 recovers to the standby mode (FIGS. 3(e) and 3(f)).

Figure 4:
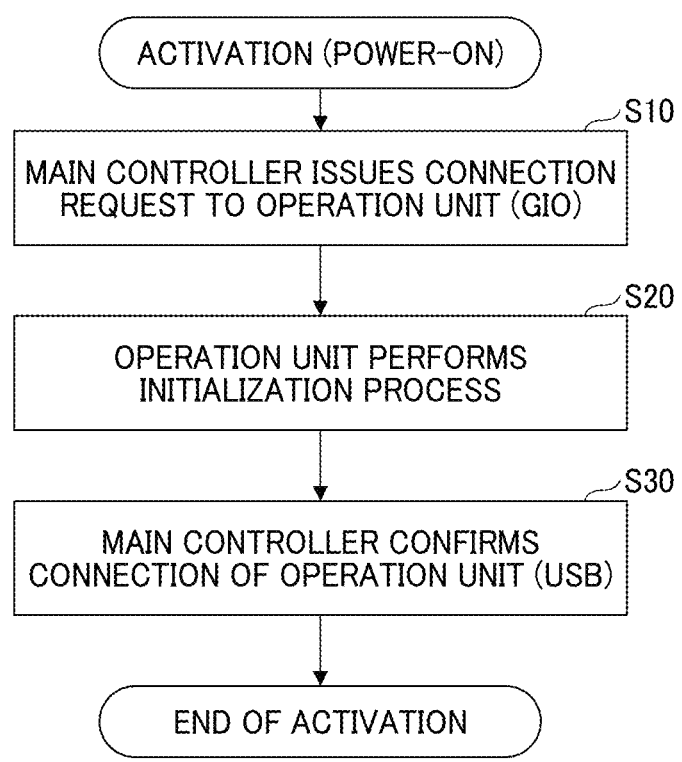
FIG. 4 is a flowchart illustrating an example of operations of an image processing apparatus at the time of activation of the image forming apparatus in FIG. 1.

FIG. 4 is a flowchart illustrating an example of operations of the image processing apparatus 500 at the time of activation of the image forming apparatus 1 in FIG. 1. That is, FIG. 4 illustrates an example of a power supply control method of the image processing apparatus 500. The flow illustrated in FIG. 4 is started in response to activation of the image forming apparatus 1 by turning on the power switch of the image forming apparatus 1.

When the power switch is turned on, the energy saving subsystem 120 and the microcomputer 220 are activated to start the operation. The activated energy saving subsystem 120 powers on the SoC 110. The started microcomputer 220 powers on the SoC 210. The power-on of the SoC 110 by the energy saving subsystem 120 may be performed in step S10. The power-on of the SoC 210 by the microcomputer 220 may be performed in step S20.

Then, in step S10, the main controller 100 illustrated in FIG. 2 issues a connection request to the operation unit 200 using the GIO. For example, in step S10, the energy saving subsystem 120 issues a connection request to the microcomputer 220 using the GIO (5).

Next, in step S20, the operation unit 200 (the microcomputer 220 and the SoC 210) having received the connection request from the main controller 100 performs initialization processing of the operation unit 200. When the initialization processing of the operation unit 200 is completed, communication using the USB interface becomes possible between the main controller 100 and the operation unit 200.

Then, in step S30, the main controller 100 confirms the connection with the operation unit 200 and the completion of the initialization processing of the operation unit 200 by the successful communication with the operation unit 200 using the USB bus. Accordingly, the activation process illustrated in FIG. 3 ends.

Figure 5:
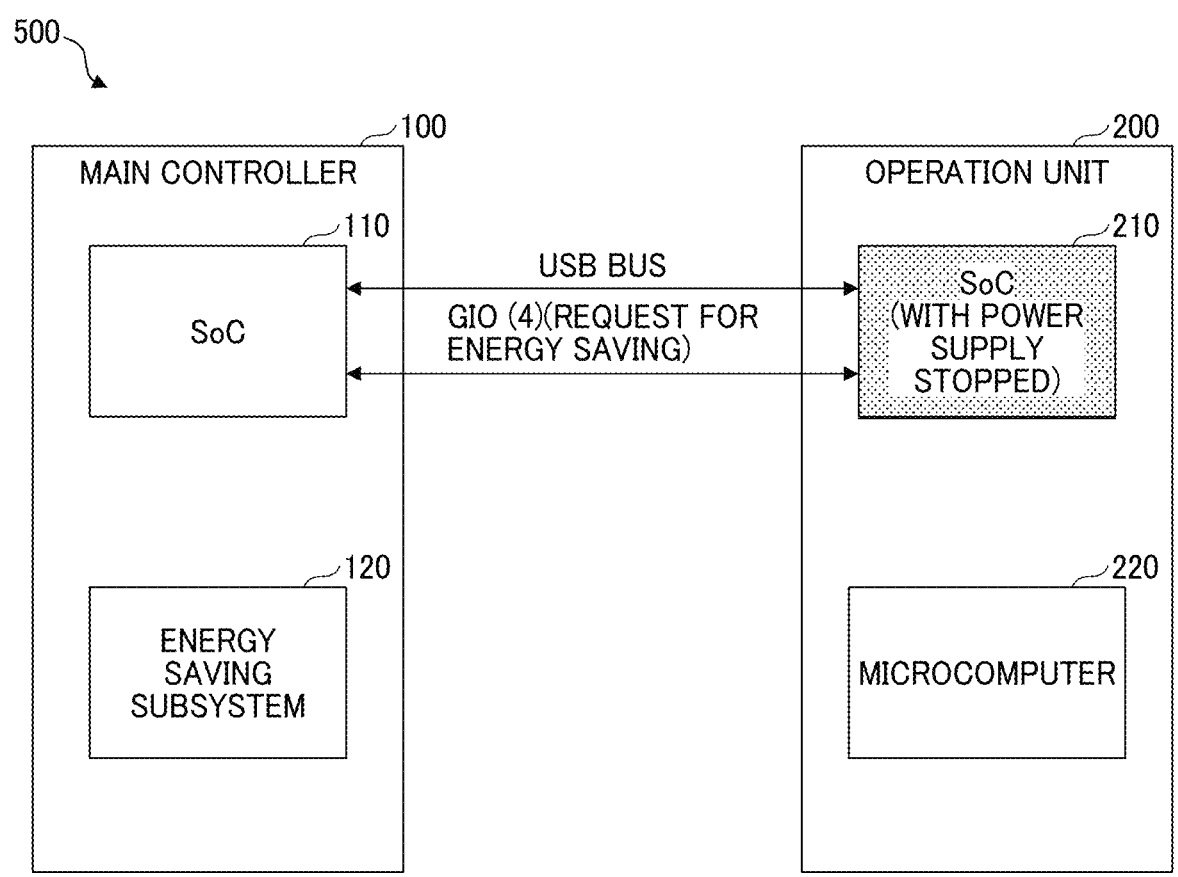
FIG. 5 is a diagram illustrating an example of a change in a power supply state of the image processing apparatus during a first energy saving mode.

FIG. 5 is a diagram illustrating an example of a change in a power supply state of the image processing apparatus 500 during the first energy saving mode. That is, FIG. 5 illustrates an example of a power supply control method of the image processing apparatus 500. During the standby mode, when detecting a trigger for shift to the first energy saving mode, the SoC 110 issues a request for shift to the first energy saving mode (energy saving request) to the SoC 210 of the operation unit 200 using the GIO (4).

The operation unit 200 stops power supply to the SoC 210 in response to the request for shift to the first energy saving mode received by the SoC 210. Then, the image forming apparatus 1 shifts from the standby mode to the first energy saving mode. As a result, the image processing apparatus 500 can shorten the time of shift to the first energy saving mode as compared with the case where the power supply is stopped using the I²C bus, for example. During the first energy saving mode, the main controller 100 (the SoC 110 and the energy saving subsystem 120) and the microcomputer 220 of the operation unit 200 continue to operate while power supply is maintained.

Figure 6:
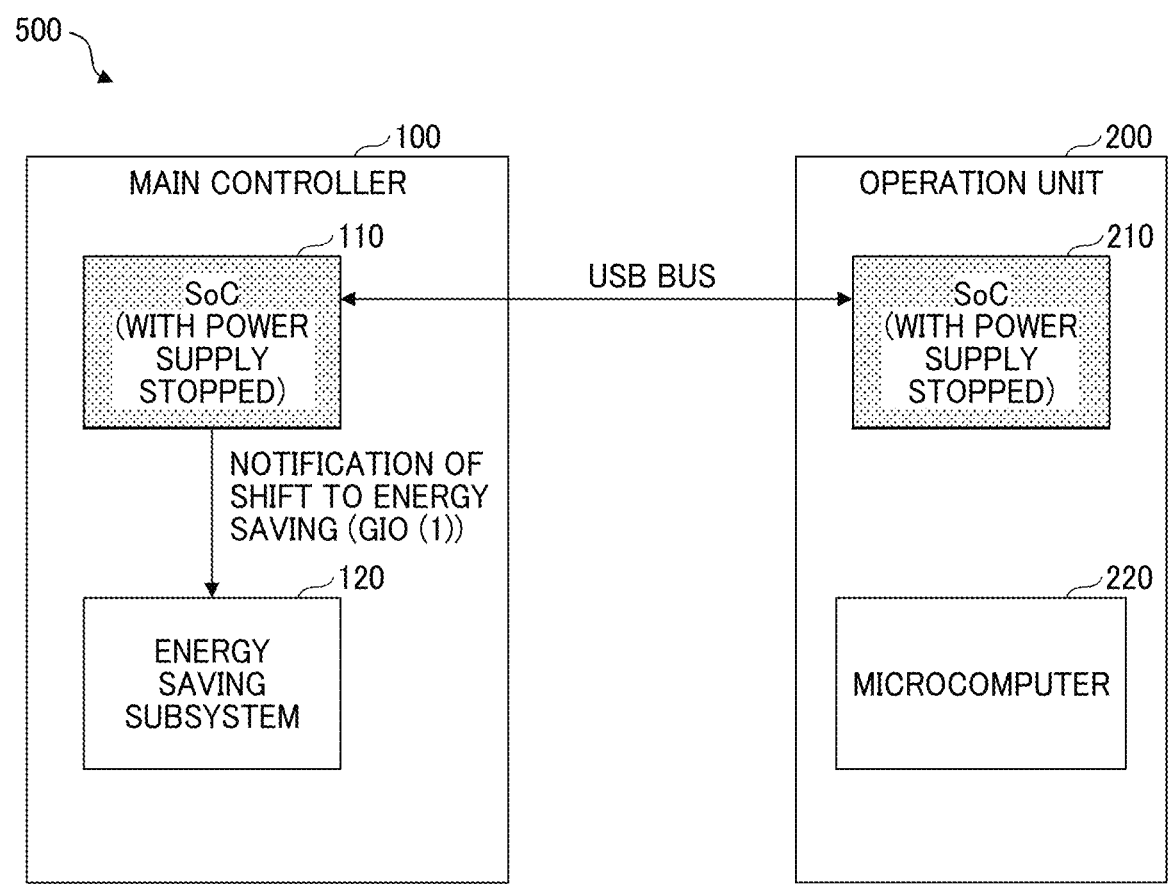
FIG. 6 is a diagram illustrating an example of a change in the power supply state of the image processing apparatus during a second energy saving mode.

FIG. 6 is a diagram illustrating an example of a change in a power supply state of the image processing apparatus 500 during the second energy saving mode. That is, FIG. 6 illustrates an example of a power supply control method of the image processing apparatus 500. During the first energy saving mode, when detecting a trigger for shift to the second energy saving mode, the SoC 110 issues a notification of the shift to the second energy saving mode to the energy saving subsystem 120 using the GIO (1).

The energy saving subsystem 120 stops the power supply to the SoC 110 in response to the notification of the shift to the second energy saving mode. Then, the image forming apparatus 1 shifts from the first energy saving mode to the second energy saving mode. As a result, the image processing apparatus 500 can shorten the time of shift to the second energy saving mode as compared with the case where the power supply is stopped using the I²C bus, for example. During the second energy saving mode, the energy saving subsystem 120 of the main controller 100 and the microcomputer 220 of the operation unit 200 continue to operate while power supply is maintained. The energy saving subsystem 120 starts monitoring of a recovery event for recovery to the standby mode in response to the notification of the shift to the second energy saving mode.

Figure 7:
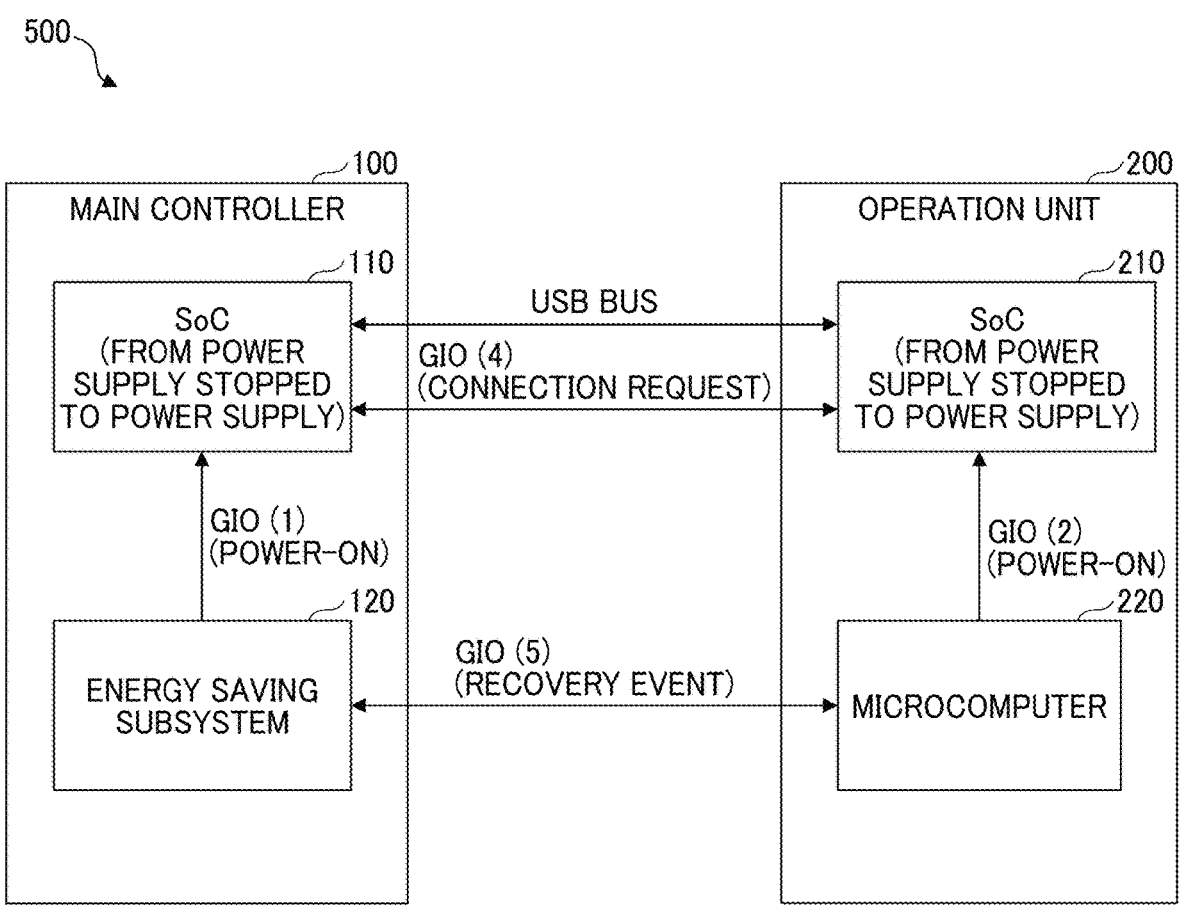

FIG. 7 is a diagram illustrating an example of a change in the power supply state of the image processing apparatus 500 in a case where the image processing apparatus recovers from the second energy saving mode to the standby mode or the like. That is, FIG. 7 illustrates an example of a power supply control method of the image processing apparatus 500. A factor of recovery to the standby mode or the like occurs in the operation unit 200 or the main controller 100.

When the cause of the recovery to the standby mode or the like occurs in the operation unit 200, the microcomputer 220 powers on the SoC 210 using the GIO (2). The microcomputer 220 notifies the energy saving subsystem 120 of a recovery event to the standby mode or the like using the GIO (5). In the SoC 210, power supply to the components other than the GIO is stopped during the first energy saving mode or the second energy saving mode. Therefore, the SoC 210 can receive data indicating an instruction for power-on via the powered GIO, and can be powered on.

The energy saving subsystem 120 having received the notification of the recovery event powers on the SoC 110 using the GIO (1). In the SoC 110, power supply to the components other than the GIO ports is stopped during the second energy saving mode. Therefore, the SoC 110 can receive data indicating an instruction for power on via the powered GIO by the GIO port, and can be powered on.

Then, the process of shift from the second energy saving mode to the standby mode or the like is completed. As a result, the image processing apparatus 500 can shorten the time of shift from the second energy saving mode to the standby mode as compared with the case where the power supply is stopped using the I²C bus, for example. The bits of the GIO (1) used to power on the SoC 110 are different from the bits of the GIO (1) used to notify the energy saving subsystem 120 of the shift to the second energy saving mode from the SoC 110 illustrated in FIG. 6.

Figure 8:
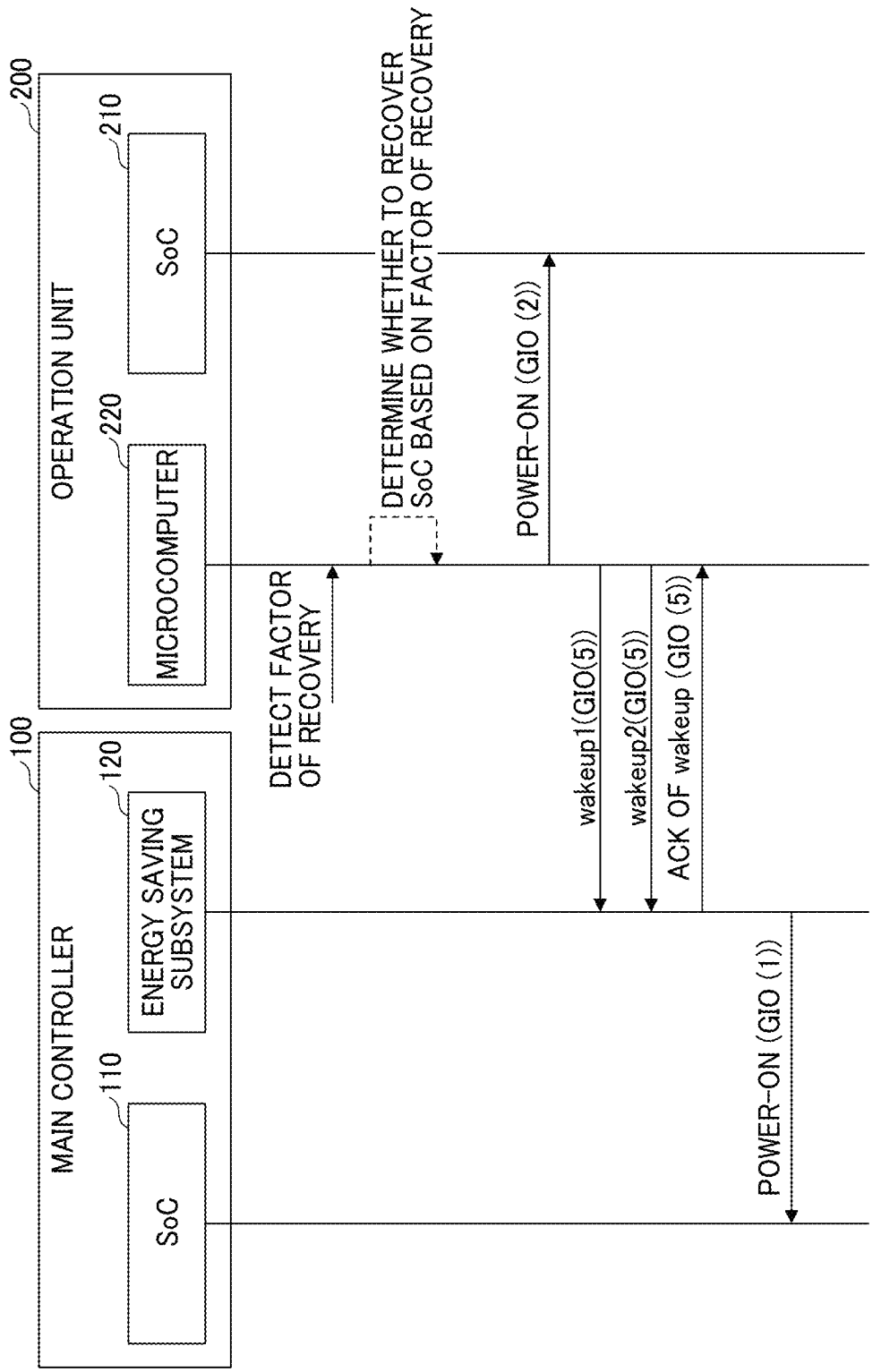
FIG. 8 is a diagram illustrating an example of an operation sequence in a case where a factor of recovery from the second energy saving mode is an operation unit.

FIG. 8 is a diagram illustrating an example of an operation sequence in a case where a factor of recovery from the second energy saving mode is the operation unit 200. That is, FIG. 8 illustrates an example of a power supply control method of the image processing apparatus 500. When detecting a factor of recovery to the standby mode or the like, the microcomputer 220 of the operation unit 200 determines whether to recover the SoC 210 and the SoC 110 (that is, whether to power on the SoC 210 and the SoC 110).

For example, the factor of recovery in the operation unit 200 is an operation of the operation panel, a reception operation by the wireless communication unit 230, or the like. The microcomputer 220 determines that recovery is to be performed when the factor of recovery is the operation of the operation panel, but determines that recovery is not to be performed when the factor of recovery is the reception operation by the wireless communication unit 230.

In the case of recovering the SoC 210 and the SoC 110, the microcomputer 220 powers on the SoC 210 using the GIO (2). The microcomputer 220 notifies the energy saving subsystem 120 of a recovery event to the standby mode or the like (wakeup1, wakeup2) using two GIO (5). As a result, the energy saving subsystem 120 can be notified of any of the plurality of factors of recovery from the energy saving mode.

The energy saving subsystem 120 having received the notification of the recovery event returns ACK, which is a response to the recovery event, to the microcomputer 220 using a GIO (5) different from the GIO (5) that have received wakeup1 and wakeup2. This makes it possible to suppress collision between the notification of the recovery event and the response to the notification of the recovery event in the GIO (5), and to suppress malfunction of the image processing apparatus 500.

The energy saving subsystem 120 having received the notification of the recovery event powers on the SoC 110 using the GIO (1). Then, power is supplied to the SoC 210 and the SoC 110, and the image forming apparatus 1 recovers from the second energy saving mode to the standby mode or the like.

FIG. 9 is a diagram illustrating an example of factors of recovery a notification of which is provided from the microcomputer 220 to the energy saving subsystem 120. The notification of the factor of recovery is provided from the microcomputer 220 to the energy saving subsystem 120 by wakeup1 and wakeup2 by the 2-bit GIO (5).

In the example illustrated in FIG. 9, there are three factors of recovery. In the present embodiment, the main controller 100 recovered from the second energy saving mode has a plurality of states such as the state in the active mode, the state in the standby mode, and the state in the first energy saving mode. Therefore, when the factor of recovery is the operation unit 200, the microcomputer 220 notifies the main controller 100 of the state to be recovered from the second energy saving mode. That is, the microcomputer 220 can detect a plurality of factors of recovery from the energy saving mode.

If there is one factor of recovery, the GIO (5) used for notification needs to be one bit. If the number of factors of recovery is four or more, the GIO (5) used for notification needs to be three bits or more.

For example, the microcomputer 220 sets wakeup1 and wakeup2 to a logical value 1 in a default state with no factor of recovery. When detecting a factor of recovery 1, the microcomputer 220 sets wakeup1 to the logical value 1 and sets wakeup2 to a logical value 0.

When detecting a factor of recovery 2, the microcomputer 220 sets wakeup1 to the logical value 0 and sets wakeup2 to the logical value 1. When detecting a factor of recovery 3, the microcomputer 220 sets wakeup1 and wakeup2 to the logical value 0.

When wakeup1 and wakeup2 change from "1" and "1" to "1" and "0", the energy saving subsystem 120 detects the factor of recovery 1. When wakeup1 and wakeup2 change from "1" and "1" to "0" and "1", the energy saving subsystem 120 detects the factor of recovery 2. When wakeup1 and wakeup2 change from "1" and "1" to "0" and "0", the energy saving subsystem 120 detects the factor of recovery 3. The relationship between the factors of recovery and the logical values of wakeup1 and wakeup2 illustrated in FIG. 9 is an example, and other combinations may be used.

Note that a notification of wakeup1 and wakeup2 is provided using different signal lines, and thus the logical values may not change at the same time. Therefore, for example, the energy saving subsystem 12 may detect the factor of recovery and power on the SoC 110 only if the change patterns of the logical values of wakeup1 and wakeup2 are continuously the same a plurality of times (for example, three times). This makes it possible to reliably perform the detection processing of the factor of recovery using the GIO.

FIG. 10 is a diagram illustrating an example of an operation sequence in a case where the factor of recovery from the second energy saving mode is the main controller 100. That is, FIG. 10 illustrates an example of a power supply control method of the image processing apparatus 500. The energy saving subsystem 120 of the main controller 100 recovers the SoC 210 and the SoC 110 when detecting a factor of recovery to the standby mode or the like. For example, the factor of recovery in the main controller 100 is a network packet received via the wired communication interface 300.

First, the energy saving subsystem 120 powers on the SoC 110 using the GIO (1). The SoC 110 having been powered on notifies the microcomputer 220 of the recovery using the GIO (6). The microcomputer 220 having received the notification of recovery powers on the SoC 210 using the GIO (2). Then, power is supplied to the SoC 210 and the SoC 110, and the image forming apparatus 1 recovers from the second energy saving mode to the standby mode or the like.

As described above, in the present embodiment, when the microcomputer 220 detects a factor of recovery to the standby mode or the like, the microcomputer 220 powers on the SoC 210 using the GIO (2), and notifies the energy saving subsystem 120 of the recovery event using the GIO (5). The energy saving subsystem 120 having received the notification of the recovery event powers on the SoC 110 using the GIO (1).

Similarly, when detecting a factor of recovery to the standby mode or the like, the energy saving subsystem 120 powers on the SoC 110 using the GIO (1), and the SoC 110 having been powered on notifies the microcomputer 220 of the recovery event using the GIO (6). The microcomputer 220 having received the notification of the recovery event powers on the SoC 210 using the GIO (2).

As a result, the image processing apparatus 500 can shorten the time of recovery from the energy saving mode, as compared with a case of powering on using the I²C bus that transmits the slave address to establish the connection with the slave, for example.

In addition, when detecting the trigger for shift to the first energy saving mode during the standby mode, the SoC 110 issues a request for shift to the first energy saving mode to the SoC 210 using the GIO (4). The SoC 210 that has received the request for shift stops power supply to the SoC 210. Further, when detecting a trigger for shift to the second energy saving mode during the first energy saving mode, the SoC 110 issues a notification of the shift to the second energy saving mode to the energy saving subsystem 120 using the GIO (1). The energy saving subsystem 120 stops the power supply to the SoC 110 in response to the notification of the shift to the second energy saving mode.

As a result, the image processing apparatus 500 can shorten the time of shift to the energy saving mode as compared with the case where the power supply is stopped using the I²C bus, for example.

When detecting a factor of recovery to the standby mode or the like, the microcomputer 220 notifies the energy saving subsystem 120 of the recovery event using two GIOs (5), for example. As a result, the energy saving subsystem 120 can be notified of any of the plurality of factors of recovery from the energy saving mode.

The energy saving subsystem 120 having received the notification of the recovery event returns a response to the recovery event to the microcomputer 220 using a GIO (5) different from the GIO (5) that has received the notification of the recovery event. This makes it possible to suppress collision between the notification of the recovery event and the response to the notification of the recovery event in the GIO (5), and to suppress malfunction of the image processing apparatus 500.

Furthermore, if the factor of recovery is the operation unit 200, the energy saving subsystem 120 detects the factor of recovery and powers on the SoC 110 only when a notification of the recovery event is continuously received from the microcomputer 220 a plurality of times. As a result, even in a case where the logical values of the plurality of bits of the GIO (5) do not change simultaneously, for example, it is possible to reliably perform the detection processing of the factor of recovery using the GIO.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The invention claimed is:

1. An image processing apparatus comprising:
a first controller including:
first control circuitry configured to control an image former to form an image; and
first power supply control circuitry configured to control power supply to the first control circuitry; and
a second controller including:
second control circuitry configured to control an external interface to receive an operation from outside of the image processing apparatus; and
second power supply control circuitry configured to control power supply to the second control circuitry and configured to receive an operation from outside of the image processing apparatus during a power saving mode,
wherein the first power supply control circuitry and the first control circuitry are connected through a first general-purpose input-and-output port,
the second power supply control circuitry and the second control circuitry are connected through a second general-purpose input-and-output port, and
the first power supply control circuitry and the second power supply control circuitry are connected through a third general-purpose input-and-output port, wherein in a case in which power supply to the first control circuitry and the second control circuitry except for the first general-purpose input-and-output port, the second general-purpose input-and-output port, and the third general-purpose input-and-output port is stopped in the power saving mode, when the second power supply control circuitry detects a factor of recovery from the power saving mode, the second power supply control circuitry powers on the second control circuitry though the second general-purpose input-and-output port and notifies the first power supply control circuitry of a recovery from the power saving mode though the third general-purpose input-and-output port, and when the first power supply control circuitry receives a notification of the recovery from the power saving mode from the second power supply control circuitry, the first power supply control circuitry powers on the first control circuitry though the first general-purpose input-and-output port.

2. The image processing apparatus according to claim 1, wherein when the first power supply control circuitry detects the factor of recovery from the power saving mode, the first power supply control circuitry powers on the first control circuitry though the first general-purpose input-and-output port and notifies the second power supply control circuitry of the recovery from the power saving mode though the third general-purpose input-and-output port, and when the second power supply control circuitry receives a notification of the recovery from the power saving mode from the first power supply control circuitry, the second power supply control circuitry powers on the second control circuitry though the second general-purpose input-and-output port.

3. The image processing apparatus according to claim 1, wherein the power saving mode includes a first power saving mode in which power supply to the second control circuitry is stopped and a second power saving mode in which power supply to the second control circuitry and the first control circuitry is stopped.

4. The image processing apparatus according to claim 3, wherein when the first control circuitry detects a trigger for shift to the second power saving mode during the first power saving mode, the first control circuitry issues a notification of shift to the second power saving mode to the first power supply control circuitry though the first general-purpose input-and-output port, and stops power supply to the first control circuitry.

5. The image processing apparatus according to claim 1, wherein a plurality of input-and-output ports of the first power supply control circuitry and a plurality of general-purpose input-and-output ports of the second power supply control circuitry are connected to each other, and wherein the second power supply control circuitry is configured to:

detect a plurality of factors of recovery from the power saving mode; and notify the first power supply control circuitry of one of the plurality of factors of recovery detected by the second power supply control circuitry, though the plurality of general-purpose input-and-output ports of the second power supply control circuitry.

6. The image processing apparatus according to claim 5, wherein when the first power supply control circuitry receives the one of the plurality of factors of recovery from the second power supply control circuitry through one of the plurality of input-and-output ports of the first power supply control circuitry, the first power supply control circuitry notifies the second power supply control circuitry of a response to the one of the plurality of factors of recovery though another one different from the one of the plurality of input-and-output ports of the first power supply control circuitry.

7. The image processing apparatus according to claim 5, wherein the second power supply control circuitry notifies the first power supply control circuitry a plurality of times of one of the plurality of factors of recovery detected by the second power supply control circuitry, though the plurality of general-purpose input-and-output ports of the second power supply control circuitry, and when all of the plurality of times of notifications indicate a same factor of recovery, the first power supply control circuitry powers on the first control circuitry.

8. An image forming apparatus comprising:
an image former configured to form an image;
a first controller including:
  first control circuitry configured to control the image former to form the image; and
  first power supply control circuitry configured to control power supply to the first control circuitry; and
a second controller including:
  second control circuitry configured to control an external interface to receive an operation from outside of the image forming apparatus; and
  second power supply control circuitry configured to control power supply to the second control circuitry and configured to receive an operation from outside of the image forming apparatus during a power saving mode,
wherein the first power supply control circuitry and the first control circuitry are connected through a first general-purpose input-and-output port,
the second power supply control circuitry and the second control circuitry are connected through a second general-purpose input-and-output port, and
the first power supply control circuitry and the second power supply control circuitry are connected through a third general-purpose input-and-output port,
wherein in a case in which power supply to the first control circuitry and the second control circuitry except for the first general-purpose input-and-output port, the second general-purpose input-and-output port, and the third general-purpose input-and-output port is stopped in the power saving mode,
when the second power supply control circuitry detects a factor of recovery from the power saving mode, the second power supply control circuitry powers on the second control circuitry though the second general-purpose input-and-output port and notifies the first power supply control circuitry of a recovery from the power saving mode though the third general-purpose input-and-output port, and
when the first power supply control circuitry receives a notification of the recovery from the power saving mode from the second power supply control circuitry, the first power supply control circuitry powers on the first control circuitry though the first general-purpose input-and-output port.

9. An information processing apparatus comprising:
a first controller including:
- first control circuitry configured to control a data processor to execute data processing; and
- first power supply control circuitry configured to control power supply to the first control circuitry; and a second controller including:
- second control circuitry configured to control an external interface to receive an operation from outside of the information processing apparatus; and
- second power supply control circuitry configured to control power supply to the second control circuitry and configured to receive an operation from outside of the information processing apparatus during a power saving mode, wherein the first power supply control circuitry and the first control circuitry are connected through a first general-purpose input-and-output port, the second power supply control circuitry and the second control circuitry are connected through a second general-purpose input-and-output port, and the first power supply control circuitry and the second power supply control circuitry are connected through a third general-purpose input-and-output port;

wherein in a case in which power supply to the first control circuitry and the second control circuitry except for the first general-purpose input-and-output port, the second general-purpose input-and-output port, and the third general-purpose input-and-output port is stopped in the power saving mode, when the second power supply control circuitry detects a factor of recovery from the power saving mode, the second power supply control circuitry powers on the second control circuitry though the second general-purpose input-and-output port and notifies the first power supply control circuitry of a recovery from the power saving mode though the third general-purpose input-and-output port, and when the first power supply control circuitry receives a notification of the recovery from the power saving mode from the second power supply control circuitry, the first power supply control circuitry powers on the first control circuitry though the first general-purpose input-and-output port.

* * * * *